United States Patent
Tubb

(10) Patent No.: US 11,468,392 B2
(45) Date of Patent: Oct. 11, 2022

(54) METHODS, SYSTEMS, AND COMMUNICATION PROTOCOLS FOR PROXIMITY MONITORING MOBILE NETWORK AND ASSOCIATED METHODS

(71) Applicant: iControl, Inc., Santa Clara, CA (US)

(72) Inventor: Earl Fred Tubb, Santa Cruz, CA (US)

(73) Assignee: ICONTROL, INC., Santa Clara, CA (US)

( * ) Notice: Subject to any disclaimer, the term of this patent is extended or adjusted under 35 U.S.C. 154(b) by 700 days.

(21) Appl. No.: 15/946,717

(22) Filed: Apr. 5, 2018

(65) Prior Publication Data

US 2018/0293539 A1 Oct. 11, 2018

Related U.S. Application Data

(60) Provisional application No. 62/481,687, filed on Apr. 5, 2017.

(51) Int. Cl.
| | | |
|---|---|---|
| *G06Q 10/08* | (2012.01) | |
| *H04L 1/16* | (2006.01) | |
| *H04W 84/06* | (2009.01) | |
| *H04W 84/04* | (2009.01) | |
| *H04W 84/18* | (2009.01) | |

(52) U.S. Cl.
CPC .......... *G06Q 10/0833* (2013.01); *H04L 1/16* (2013.01); *H04W 84/042* (2013.01); *H04W 84/06* (2013.01); *H04W 84/18* (2013.01)

(58) Field of Classification Search
CPC ... G06Q 10/0833; H04L 1/16; H04W 84/042; H04W 84/06; H04W 84/18
USPC ........ 705/330, 331, 332, 333, 335, 337, 338
See application file for complete search history.

(56) References Cited

U.S. PATENT DOCUMENTS

| 7,426,484 B2* | 9/2008 | Joyce ................... G06Q 10/08 235/385 |
| 9,306,750 B2* | 4/2016 | Syngkon ............ H04L 63/0428 |
| 2006/0091206 A1* | 5/2006 | Olsen .................... G06Q 10/08 235/384 |

(Continued)

OTHER PUBLICATIONS

Erera, Alan et al. "Improved Load Plan Design Through Integer Programming Based Local Search." Transportation science 47.3 (2013): 412-427. Web. (Year: 2013).*

*Primary Examiner* — Akiba K Robinson
(74) *Attorney, Agent, or Firm* — Penilla IP, APC

(57) ABSTRACT

A managing wireless device includes a local area communication device, a wide area communication device, a global position determination device, and a battery. The managing wireless device is attached to a first shipment component of a consolidated shipment. The managing wireless device is in communication with a server computing system. The managing wireless device has a unique identifier. Each of one or more additional wireless device(s) includes a local area communication device and a battery. Each of the additional wireless device(s) is attached to a respective shipment component of the consolidated shipment, other than the first shipment component. Each of the additional wireless device(s) is in bi-directional communication with the managing wireless device. Each of the additional wireless device(s) has a unique identifier. The managing wireless device and each of the additional wireless device(s) are associated with a same broadcast address.

20 Claims, 4 Drawing Sheets

(56) References Cited

U.S. PATENT DOCUMENTS

| | | | | |
|---|---|---|---|---|
| 2009/0125425 A1* | 5/2009 | Kloostra | ................ | G06Q 10/08 705/29 |
| 2015/0110100 A1* | 4/2015 | Ota | ...................... | H04W 8/005 370/338 |
| 2015/0142483 A1* | 5/2015 | Bergdale | ................ | H04W 4/80 705/5 |
| 2015/0154559 A1* | 6/2015 | Barbush | ........... | G06Q 10/08355 705/338 |

* cited by examiner

METHODS, SYSTEMS, AND COMMUNICATION PROTOCOLS FOR PROXIMITY MONITORING MOBILE NETWORK AND ASSOCIATED METHODS

CLAIM OF PRIORITY

This application claims priority under 35 U.S.C. 119(e) to U.S. Provisional Patent Application No. 62/481,687, filed Apr. 5, 2017, the disclosure of which is incorporated herein by reference in its entirety for all purposes.

BACKGROUND

Conventional supply chain tracking systems consolidate multiple components of a shipment into one or more containers that are then tracked as an aggregate group using a single waybill number. If a shipment component becomes separated from the aggregate group of components of the shipment during transit, there is no way to automatically and accurately identify when and where the shipment component separation occurred. With current technologies, shippers can only identify separated shipment components when the components of the shipment are scanned at a waypoint and verified against the waybill. Shippers who rely on waypoint checks for their shipment status are incapable of identifying precisely where a shipment component has disappeared. With current approaches, it is only possible to determine that a shipment component disappeared between two discrete waypoints of the shippers supply chain. Therefore, with current consolidated shipment tracking systems, the highest precision by which a location can be determined where a shipment component was lost is between two discrete waypoints of the shippers supply chain. And, with increasing globalization, the two discrete waypoints of the shippers supply chain between which the shipment component is lost can be substantially far apart, such as in two different countries. Therefore, with current consolidated shipment tracking systems, it can be difficult to locate lost components of consolidated shipments. It is within this context that the present invention arises.

SUMMARY

In an example embodiment, a system for monitoring a consolidated shipment is disclosed. The system includes a first wireless device configured to include a local area communication device, a wide area communication device, a global position determination device, and a battery. The first wireless device is configured for attachment to a first shipment component of the consolidated shipment. The first wireless device is configured for communication with a server computing system through the wide area communication device. The first wireless device has a unique identifier. The system also includes a second wireless device configured to include a local area communication device and a battery. The second wireless device is configured for attachment to a second shipment component of the consolidated shipment. The second wireless device is configured for bi-directional communication with the first wireless device through the local area communication devices of the first and second wireless devices. The second wireless device has a unique identifier. The first wireless device and the second wireless device are associated with a same broadcast address.

In an example embodiment, a method is disclosed for establishing a Proximity Monitoring Mobile Network (PMMN) for a consolidated shipment. The method includes transmitting a unique identifier of a managing wireless device to a server computing system. The managing wireless device is attached to a first shipment component of the consolidated shipment. The unique identifier of the managing wireless device is included in the PMMN for the consolidated shipment. The method also includes transmitting a unique identifier of the first shipment component to the server computing system for association with the unique identifier of the managing wireless device at the server computing system. The method also includes transmitting a unique identifier of an additional wireless device to the server computing system. The additional wireless device is attached to an additional shipment component of the consolidated shipment. The unique identifier of the additional wireless device is included in the PMMN for the consolidated shipment. The method also includes transmitting a unique identifier of the additional shipment component to the server computing system for association with the unique identifier of the additional wireless device at the server computing system. The method also includes receiving at the managing wireless device from the server computing system a unique broadcast address for the PMMN for the consolidated shipment and a listing of each unique identifier of wireless devices included in the PMMN for the consolidated shipment. The method also includes operating the managing wireless device to transmit an acknowledgement request to each wireless device in the PMMN for the consolidated shipment using the unique broadcast address for the PMMN for the consolidated shipment. The method also includes operating the managing wireless device to determine whether or not an acknowledgement response is received from each wireless device in the PMMN for the consolidated shipment in reply to the acknowledgement request.

In an example embodiment, a method is disclosed for establishing a PMMN for a consolidated shipment. The method includes receiving a unique identifier of a managing wireless device of the PMMN for the consolidated shipment at a server computing system. The managing wireless device is attached to a first shipment component of the consolidated shipment. The unique identifier of the managing wireless device is included in the PMMN for the consolidated shipment. The method also includes receiving a unique identifier of the first shipment component at the server computing system. The method also includes creating and storing an association between the unique identifier of the managing wireless device and the unique identifier of the first shipment component at the server computing system. The method also includes receiving a unique identifier of an additional wireless device of the PMMN for the consolidated shipment at the server computing system. The additional wireless device attached to an additional shipment component of the consolidated shipment. The unique identifier of the additional wireless device is included in the PMMN for the consolidated shipment. The method also includes receiving a unique identifier of the additional shipment component at the server computing system. The method also includes creating and storing an association between the unique identifier of the additional wireless device and the unique identifier of the additional shipment component at the server computing system. The method also includes receiving an instruction at the server computing system to proceed with commissioning of the PMMN for the consolidated shipment. The method also includes generating a unique broadcast address for the PMMN for the consolidated shipment. The method also includes transmitting the unique broadcast address for the PMMN for the consolidated shipment to the managing wireless device. The method also includes generating a listing of unique identifiers of wireless devices of the PMMN for the consolidated shipment. The method also includes transmitting the listing of unique identifiers of wireless devices of the PMMN for the consolidated shipment to the managing wireless device.

In an example embodiment, a method is disclosed for operating a PMMN for a consolidated shipment. The method includes operating a managing wireless device of the PMMN for the consolidated shipment to periodically transmit an acknowledgement request that includes a unique broadcast address of the PMMN for the consolidated shipment. The managing wireless device is attached to a first shipment component of the consolidated shipment. The method also includes operating each of at least one additional wireless device of the PMMN for the consolidated shipment that receives the acknowledgement request to respond by transmitting an acknowledgement response to the managing wireless device. Each of the at least one additional wireless device is attached to a respective shipment component of the consolidated shipment. The method also includes operating the managing wireless device to determine whether or not each of the at least one additional wireless device of the PMMN for the consolidated shipment has responded to the acknowledgement request within a set time window. The method also includes operating the managing wireless device to record an acknowledgment failure event for each wireless device of the PMMN for the consolidated shipment that does not respond to the acknowledgement request within the set time window. The acknowledgment failure event includes an identifier of each wireless device of the PMMN for the consolidated shipment that does not respond to the acknowledgement request within the set time window, and a date and a time when the acknowledgment failure event occurs, and a global position of the managing wireless device when the acknowledgment failure event occurs.

DETAILED DESCRIPTION

Figure 1:
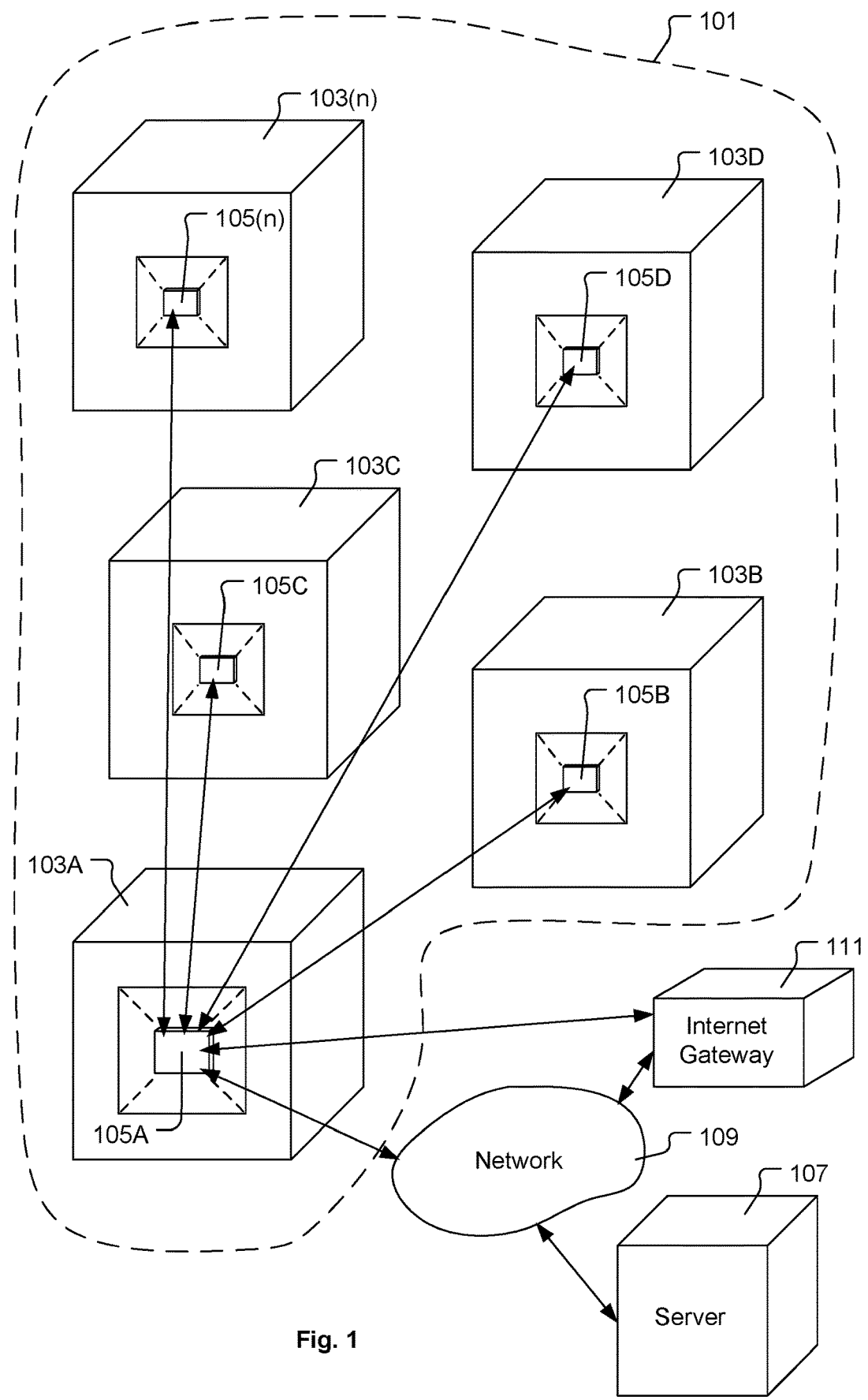
FIG. 1 shows an example consolidated shipment that includes multiple shipment components, in accordance with some embodiments.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Systems and associated methods and wireless communication protocols are disclosed herein for wirelessly linking multiple shipment components to each other, where the multiple shipment components collectively form a consolidated shipment. The term "shipment component" as used herein refers to any parcel and/or any item of any type that is included as a physically separate part of a consolidated shipment. The wireless linking of the multiple shipment components to each other provides for monitoring of the proximity of individual ones of the multiple shipment components to each other during shipping of the consolidated shipment. In various embodiments, wireless devices are respectively attached to the multiple shipment components of the consolidated shipment prior to, or as part of, packaging and consolidation of the consolidated shipment. The wireless devices are configured to implement and utilize a secure communication protocol to create a Proximity Monitoring Mobile Network (PMMN) that is uniquely assigned to the consolidated shipment and to a waybill associated with the consolidated shipment. During creation of the PMMN for the consolidated shipment, i.e., during a shipment commissioning process, a unique identifier is assigned to the PMMN. In some embodiments, the wireless technology utilized by the wireless devices within the PMMN is selected to be globally ubiquitous, license free, and operate with batteries, packaging, and processor control suitable for operation on commercial passenger aircraft.

The systems and associated methods and wireless communication protocols disclosed herein monitor and maintain the status of the consolidated shipment by using wireless signals to verify that shipment components are in proximity to each other throughout shipping of the consolidated shipment. Data transferred between shipment components while making proximity measurements from one shipment component to another shipment component can also be used for other monitoring purposes. For example, data transferred between shipment components can include one or more of environmental conditions associated with a given shipment component, wireless device battery state associated with a given shipment component, in-transit shock measurements associated with a given shipment component, and vibration measurements associated with a given shipment component, among essentially any other measureable/observable condition/parameter associated with a given shipment component. At least one of the wireless devices within the PMMN of the consolidated shipment includes a global positioning system (GPS) device to enable global position tracking of the consolidated shipment.

If a shipment component of the consolidated shipment becomes separated from the other shipment components of the consolidated shipment during shipping, the systems and associated methods and wireless communication protocols disclosed herein are capable of identifying which shipment component has been separated, i.e., has gone missing, and at what time and at what location the separation of the shipment component occurred. Also, the systems and associated methods and wireless communication protocols disclosed herein are configured to transmit notifications of shipment faults, e.g., lost/missing shipment components, to users in near real-time. For example, if a shipment component is separated from the other shipment components of the consolidated shipment during shipping, the time and location of the shipment component separation is recorded and reported in near real-time utilizing Internet communication protocols. In some embodiments, the PMMN status is reported to a central server via wireless networks and/or cellular communication. Separation of a given shipment component from the consolidated shipment can be detected by an absence of the wireless device associated with the given shipment component within the PMMN. An alert can be transmitted by at least one wireless device remaining in the PMMN upon determining that the given shipment component has been separated from the consolidated shipment. This near real-time notification of shipment fault(s) provides user's, e.g., companies, with advance notice so that corrective action can be taken in a timely manner to resolve the shipment fault(s). It should be appreciated that the systems and associated methods and wireless communication protocols disclosed herein assist users with maintaining the security of their consolidated shipment, and with maintaining a reliable supply chain, and with keeping manufacturing processes on schedule.

FIG. 1 shows an example consolidated shipment 101 that includes multiple shipment components 103A-103(n), where (n) can be any number, in accordance with some embodiments. It should be understood that the systems and associated methods and wireless communication protocols disclosed herein can be used with consolidated shipments that include any number of shipment components. Each shipment component 103A-103(n) has a respective wireless device 105A-105(n) that is either attached to the shipment component 103A-103(n) (such as within a packing slip/pouch) or placed inside the shipment component 103A-103(n), such that the wireless device 105A-105(n) goes wherever the associated shipment component 103A-103(n) goes. Each wireless device 105A-105(n) includes a wireless transceiver to provide for wireless communication between the wireless devices 105A-105(n) associated with different shipment components. In some embodiments, the wireless transceivers of the wireless devices 105A-105(n) are Local Area Network (LAN) radios. The wireless devices 105A-105(n) collectively form a PMMN for the consolidated shipment 101. The transceivers within the wireless devices 105A-105(n) provide the primary communication between wireless devices 105A-105(n) within the PMMN. In some embodiments, the transceiver within one or more of the wireless devices 105A-105(n) is configured to communicate with an Internet gateway 111 and/or with other devices that may be used to configure device operation.

At least one of the wireless devices 105A-105(n) in the PMMN of the consolidated shipment 101 is a battery powered Full-Function-Device (FFD) wireless device that includes GPS tracking technology configured to autonomously determine the global position, i.e., terrestrial location, of the FFD wireless device on a periodic basis. In the example of FIG. 1, the wireless device 105A is a FFD wireless device. In the event of separation of a given shipment component from the consolidated shipment, the FFD wireless device records the global position when the given shipment component was detected missing. Also, the FFD wireless device is configured to include a Wide Area Network (WAN) communication capability, such as cellular and/or satellite communication capability. The WAN interface of the FFD wireless device provides Internet access for the wireless devices 105A-105(n) in the PMMN of the consolidated shipment 101. In this manner, the wireless device 105A (at least one of the wireless devices 105A-105(n) in the PMMN of the consolidated shipment 101) is a FFD wireless device that provides location tracking, i.e., global position tracking, and network connectivity for all of the wireless devices 105A-105(n) in the PMMN of the consolidated shipment 101. The FFD wireless device architecture includes a GPS device for global position determination and a cellular modem and/or a satellite communication device for WAN (Internet) connectivity. The FFD wireless device architecture also includes the transceiver device for radio communication with the other wireless devices 105B-105(n) in the PMMN of the consolidated shipment 101 and with the Internet gateway 111 and with other devices that may be used to configure device operation. In some embodiments, the transceiver device includes an IEEE Standard 802.15.4 radio for managing the PMMN and for communicating with the local Internet gateway 111 when available, i.e., when in range. In some embodiments, the FFD wireless device has a form factor substantially similar to that of a credit card.

Other wireless devices 105B-105(n) in the PMMN of the example consolidated shipment 101 can be either a FFD wireless device or a Reduced-Function-Device (RFD) wireless device. The RFD wireless device operates as a shipment component proximity monitoring device. The RFD wireless device is a battery powered device that includes a transceiver device, i.e., a bi-directional LAN radio, for communication with transceiver devices of the other wireless devices 105A-105(n) within the PMMN. In some embodiments, the transceiver device of the RFD wireless device is an IEEE Standard 802.15.4 radio. The RFD wireless device does not have GPS capability and does not have WAN connection capability. The RFD wireless devices function to report their proximity to the FFD wireless device 105A, that is the managing FFD(0) wireless device of the PMMN, on a periodic basis and/or requested basis. In some embodiments, RFD wireless devices communicate with the managing FFD(0) wireless device of the PMMN during configuration of the PMMN and while shipping of the consolidated shipment 101 is underway. In some embodiments, RFD wireless device can also communicate with other RFD wireless device of the PMMN, such as in a peer-to-peer manner. Each wireless device 105A-105(n) has a unique identifier that is used by the PMMN. Each wireless device 105A-105(n) provides for reading/acquiring of its unique identifier when the wireless device 105A-105(n) is physically associated with (i.e., attached to or put inside of) a shipment component. In various embodiments, different techniques can be used to read/acquire the unique identifier of a given wireless device 105A-105(n). For example, in some embodiments, the unique identifier of a given wireless device 105A-105(n) can be read/acquired using a barcode scanner, a passive radiofrequency identification (RFID), and/or some other optical device to record the unique identifier when the given wireless device 105A-105(n) is installed on a shipment component. In some embodiments, the RFD wireless device has a form factor substantially similar to that of a key fob.

A server computing system 107 is configured to communicate with the managing FFD(0) wireless device, i.e., with the wireless device 105A, through the Internet at any location of the managing FFD(0) wireless device in the world. The server computing system 107 is configured to maintain a database of archived shipment data. The server computing system 107 is also configured to provide historical map and location information for shipments, and real-time map and location information for shipments. The server computing system 107 is also configured to provide web services for displaying historical and real-time global positions (terrestrial locations) of the wireless devices 105A-105(n). The server computing system 107 is also configured to perform operations to enable command and control of the wireless devices 105A-105(n). For example, the server computing system 107 is configured to generate a guaranteed unique broadcast address for the PMMN to be used by all wireless devices 105A-105(n) of the PMMN, which enables creation of the PMMN. A unique broadcast address is generated for each consolidated shipment for use in creating the PMMN for the consolidated shipment. The unique broadcast address for the consolidated shipment is transmitted from the server computing system 107 to the managing FFD(0) wireless device of the PMMN for the consolidated shipment. The server computing system 107 is also configured to compute and send waypoints to the managing FFD(0) wireless device of the PMMN for purposes of tracking the wireless devices 105A-105(n) and controlling behavior of the wireless devices 105A-105(n) and controlling reporting of data by the wireless devices 105A-105(n). The server computing system 107 is also configured to monitor the operational states of the wireless devices 105A-105(n), including monitoring of battery charge levels, cellular usage, and network performance.

The server computing system 107 is also configured to determine when alert conditions exist with regard to a monitored/tracked consolidated shipment. For example, the server computing system 107 is configured to manage computations associated with overdue departures of the consolidated shipment, overdue arrivals of the consolidated shipment, separation of shipment components from the consolidated shipment, and failed deliveries of the consolidated shipment, such as delivery of the consolidated shipment to a wrong location. The server computing system 107 is also configured to provide a web services interface for users to interact with the consolidated shipment monitoring and tracking system, i.e., to control creation of the PMMN and to control wireless devices 105A-105(n) of the PMMN and to control acquisition and output of data associated with PMMN. The server computing system 107 is also configured to provide secured user access and electronically transmit reports to users.

In some embodiments, an Internet gateway 111 converts data received through an Internet communication protocol into a communication protocol for the PMMN so as to improve the commissioning process, i.e., the PMMN setup process, when configuring a consolidated shipment. It should be understood that the commissioning process includes acquisition and assignment/storage of the unique broadcast address generated for the PMMN, and registering of the unique identifiers of the wireless devices 105A-105(n) with the PMMN, among other operations required to configure the PMMN and make sure the wireless devices 105A-105(n) of the PMMN are in communication with each other and are uniquely associated with the consolidated shipment. In some embodiments, the Internet gateway 111 is a local network gateway that uses a direct, high-speed commanding path between the server computing system 107 and the wireless devices 105A-105(n) to enable efficient configuration of the wireless devices 105A-105(n) in order to establish the PMMN for the consolidated shipment. The Internet gateway 111 can be deployed at any location along a shipping route, but is particularly useful at origination locations where consolidated shipments are prepared for shipping, such as at factories, distribution centers, and the like, where consolidated shipments are configured on a regular basis.

Also, it should be understood that in some embodiments the commissioning process can be done without use of the Internet gateway 111. For example, in some embodiments, the network 109 can be used to establish data communication between the server computing system 107 and the wireless devices 105A-105(n) to enable acquisition and assignment/storage of the unique broadcast address for the PMMN and registering of the unique identifiers of the wireless devices 105A-105(n) with the PMMN, among other operations required to configure the PMMN and make sure the wireless devices 105A-105(n) of the PMMN are in communication with each other and are uniquely associated with the consolidated shipment. The network 109 can be configured to include essentially any type of data communication network, such as a cellular communication network, a satellite communication network, an optical data communication network, among others, or any combination thereof. Also, in some embodiments, barcode scanner technology can be used as part of the commissioning process to establish the PMMN for a consolidated shipment. For example, a barcode scanner configured to be in data communication with the server computing system 107 can be used to scan barcodes on the wireless devices 105A-105(n) in order to obtain and transmit the unique identifiers of the wireless devices 105A-105(n) to the server computing system 107 for purposes of associating the wireless devices 105A-105(n) with the PMMN of the consolidated shipment. In some embodiments, a barcode scanner device can include a LAN radio, such as an IEEE Standard 802.15.4 radio, to enable communication with the server computing system 107 by way of the network 109 and/or the Internet gateway 111.

Figure 2:
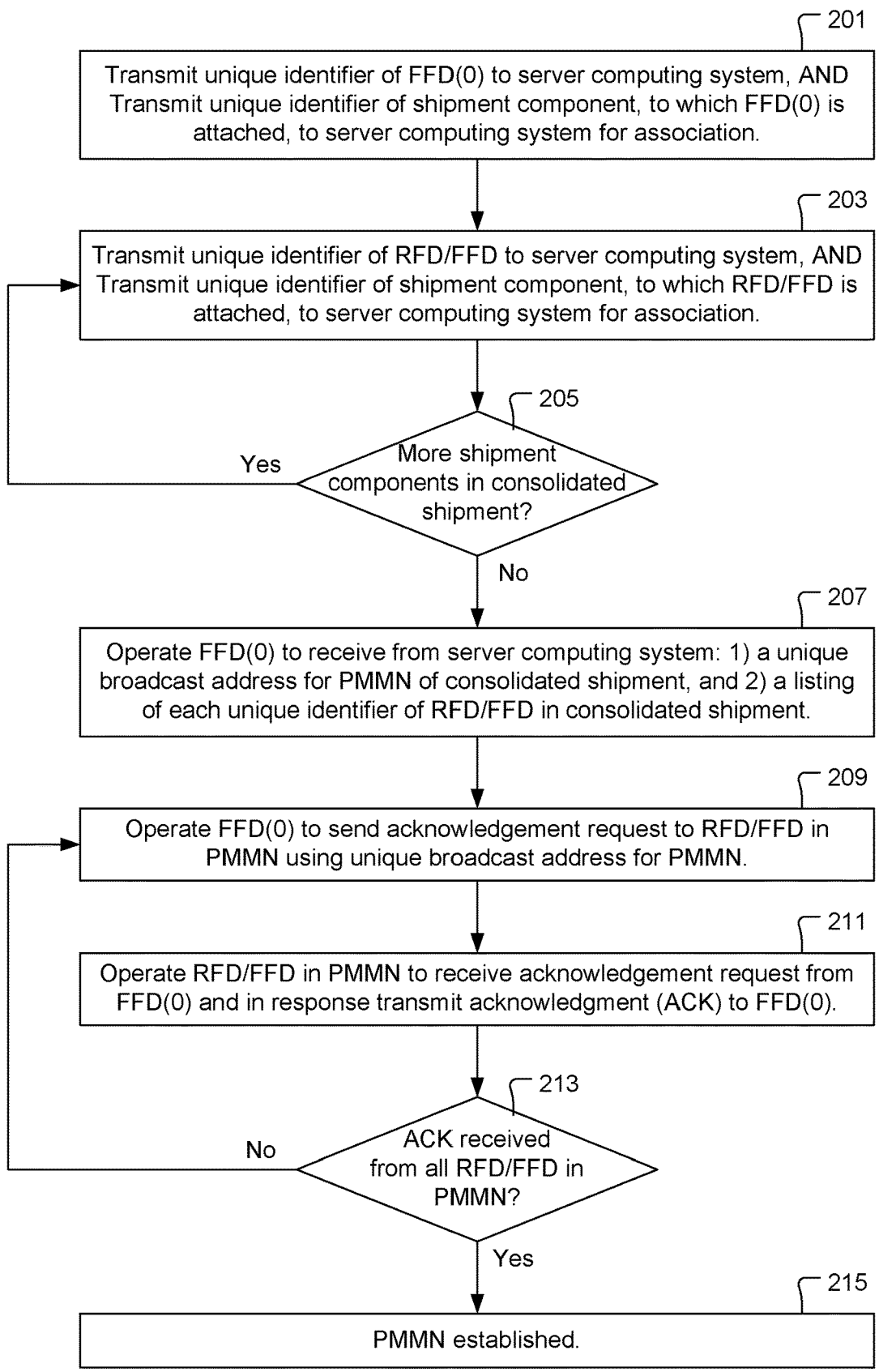
FIG. 2 shows a flowchart of a method for operating wireless devices to establish a PMMN for a consolidated shipment, in accordance with some embodiments.

FIG. 2 shows a flowchart of a method for operating wireless devices 105A-105(n) to establish a PMMN for a consolidated shipment, in accordance with some embodiments. The method includes an operation 201 in which a unique identifier of a managing FFD(0) wireless device, of the wireless 105A-105(n), is transmitted to the server computing system 107. The operation 201 also includes transmission of a unique identifier of a shipment component to which the managing FFD(0) wireless device is attached to the server computing system for association with the unique identifier of the managing FFD(0) wireless device. For example, in some embodiments, the unique identifier of the managing FFD(0) wireless device can be acquired from a label on an exterior of the managing FFD(0) wireless device using a scanning device (such as a barcode scanning device, or QR code scanning device, or passive RFID, among others) that communicates the unique identifier of the managing FFD(0) wireless device to the server computing system 107. And, similarly, in some embodiments, the unique identifier of the shipment component to which the managing FFD(0) wireless device is attached can be acquired from a shipping label of the shipment component using a scanning device (such as a barcode scanning device, or QR code scanning device, or passive RFID, among others) that communicates the unique identifier of the shipment component to the server computing system 107. It should be understood that in various embodiments, the unique identifier of the managing FFD(0) wireless device and the unique identifier of the shipment component to which the managing FFD(0) wireless device is attached can be acquired and transmitted to the server computing system 107 using means other that scanning devices. For example, in some embodiments, the unique identifier of the managing FFD(0) wireless device and the unique identifier of the shipment component to which the managing FFD(0) wireless device is attached can be entered, e.g., typed, into a computing device that is in data communication with the server computing system 107. The server computing system 107 operates to associate the unique identifier of the managing FFD(0) wireless device with the unique identifier of the shipment component to which the managing FFD(0) wireless device is attached, and to store this association within a database.

From the operation 201, the method proceeds with an operation 203 in which a unique identifier of an additional RFD/FFD wireless device (RFD or FFD wireless device) is transmitted to the server computing system 107. The operation 203 also includes transmission of a unique identifier of a shipment component to which the additional RFD/FFD wireless device is attached to the server computing system for association with the unique identifier of the additional RFD/FFD wireless device. The above-mentioned techniques for acquiring and transmitting the unique identifiers (of the managing FFD(0) wireless device and of the shipment component to which the managing FFD(0) is attached) to the server computing system 107 in operation 201 can also be used to acquire and transmit the unique identifier of the additional RFD/FFD wireless device and the unique identifier of the shipment component to which the additional RFD/FFD wireless device is attached to the server computing system 107 in the operation 203. The server computing system 107 operates to associate the unique identifier of the additional RFD/FFD wireless device with the unique identifier of the shipment component to which the additional RFD/FFD wireless device is attached, and to store this association within a database. From the operation 203, the method proceeds with an operation 205 in which a determination is made as to whether or not any more shipment components within the consolidated shipment need to be associated with a RFD/FFD wireless device. If there is another shipment component to be associated with a RFD/FFD wireless device, the method reverts back to operation 203. Otherwise, if all shipment components of the consolidated shipment have been associated with a respective RFD/FFD wireless device, the method proceeds with an operation 207.

In the operation 207, the managing FFD(0) wireless device is operated to receive from the server computing system 107: 1) a unique broadcast address for the PMMN of the consolidated shipment, and 2) a listing of each unique identifier of RFD/FFD wireless devices within the PMMN for the consolidated shipment. The method then proceeds with an operation 209 in which the managing FFD(0) wireless device operates to send an acknowledgement request to each RFD/FFD wireless device in the PMMN for the consolidated shipment using the unique broadcast address for the PMMN as received from the server computing system 107. The method then proceeds with an operation 213 in which a determination is made as to whether or not an acknowledgement response (ACK) has been received from each RFD/FFD wireless device in the PMMN for the consolidated shipment. If it is determined that an acknowledgement response has not been received from a given RFD/FFD wireless device in the PMMN for the consolidated shipment after a user-prescribed/programmed amount of time has elapsed, the method reverts back to operation 209. And, if after a user-prescribed/programmed number of unsuccessful attempts have been made to establish the PMMN (by performing operations 209-213), an alert can be transmitted from the server computing system 107 to a user responsible for commissioning the consolidated shipment to communicate information regarding which of the RFD/FFD wireless devices has not provided an acknowledgement response. The user can then take corrective action, such as to swap out the non-responding RFD/FFD wireless device with another RFD/FFD wireless and revert back to operation 203 of the method. If it is determined in operation 213 that an acknowledgement response has been received from each RFD/FFD wireless device in the PMMN for the consolidated shipment, the PMMN for the consolidated shipment is established and the consolidated shipment is ready for tracking during shipment.

Figure 3:
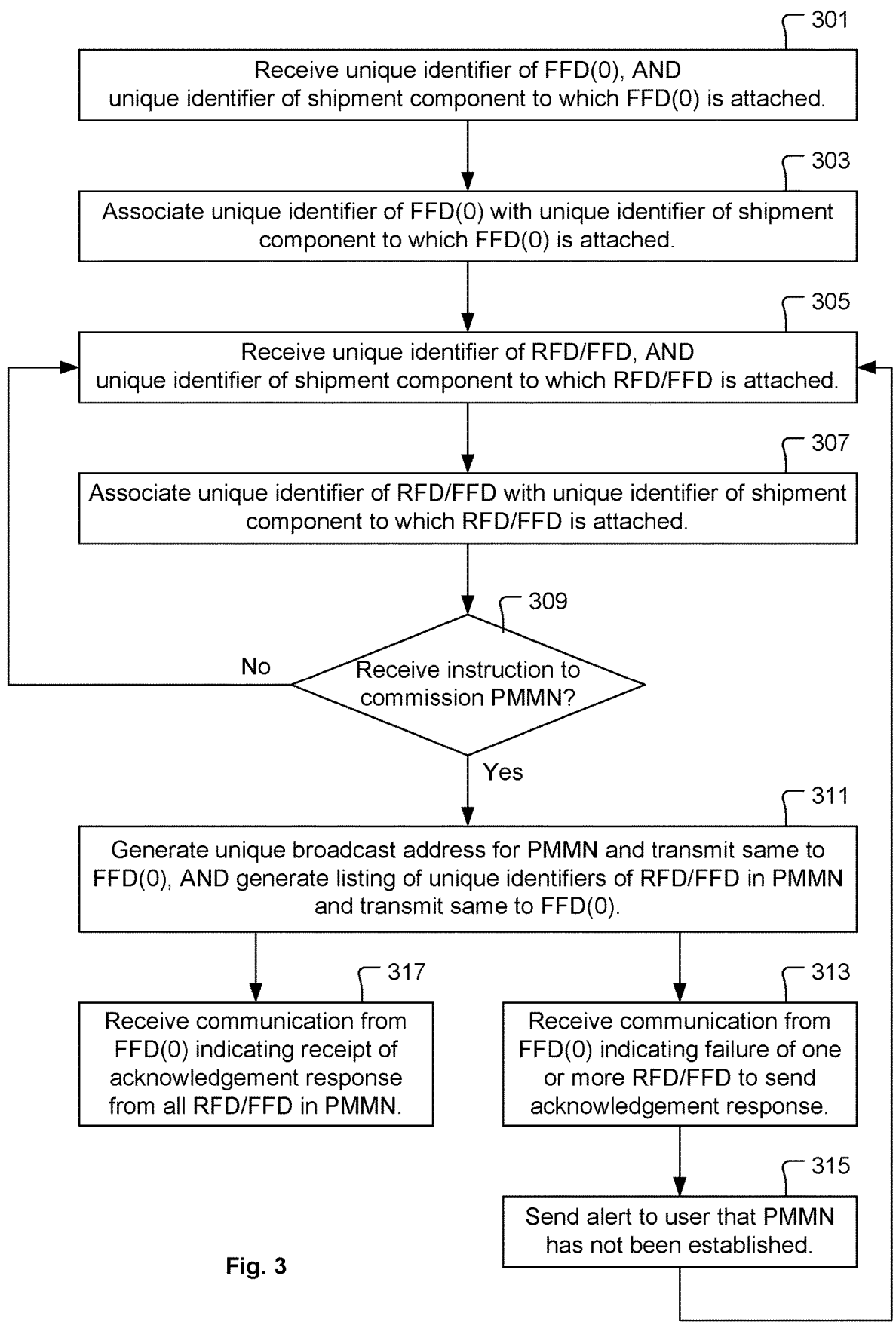
FIG. 3 shows a flowchart of a method for operating the server computing system to establish a PMMN for a consolidated shipment, in accordance with some embodiments.

FIG. 3 shows a flowchart of a method for operating the server computing system 107 to establish a PMMN for a consolidated shipment, in accordance with some embodiments. The method includes an operation 301 for receiving a unique identifier of a managing FFD(0) wireless device of the PMMN for the consolidated shipment. The operation 301 also includes receiving a unique identifier for a shipment component to which the managing FFD(0) wireless device is attached. The method proceeds with an operation 303 for associating the unique identifier of the managing FFD(0) wireless device with the unique identifier for the shipment component to which the managing FFD(0) wireless device is attached. In some embodiments, multiple shipment components can be associated with the managing FFD(0) wireless device by receiving multiple unique identifiers for multiple shipment components following receipt of the unique identifier of the managing FFD(0) wireless device. For example, if multiple shipment components are arranged together as a common physical unit, such as on a common shipping pallet or within a common shipping bin, the unique identifier of each of the multiple shipment components can be associated with the unique identifier of the managing FFD(0) wireless device that is attached to the common physical unit. The server computing system 107 operates to store the association of the unique identifier of the managing FFD(0) wireless device with the unique identifier of the shipment component(s) to which the managing FFD(0) wireless device is attached within a database.

From the operation 303, the method proceeds with an operation 305 for receiving a unique identifier of an additional RFD/FFD wireless device of the PMMN for the consolidated shipment. The operation 305 also includes receiving a unique identifier for a shipment component to which the additional RFD/FFD wireless device is attached. The method proceeds with an operation 307 for associating the unique identifier of the additional RFD/FFD wireless device with the unique identifier for the shipment component to which the additional RFD/FFD wireless device is attached. In some embodiments, multiple shipment components can be associated with the additional RFD/FFD wireless device by receiving multiple unique identifiers for multiple shipment components following receipt of the unique identifier of the additional RFD/FFD wireless device. For example, if multiple shipment components are arranged together as a common physical unit, such as on a common shipping pallet or within a common shipping bin, the unique identifier of each of the multiple shipment components can be associated with the unique identifier of the additional RFD/FFD wireless device that is attached to the common physical unit. The server computing system 107 operates to store the association of the unique identifier of the additional RFD/FFD wireless device with the unique identifier of the shipment component(s) to which the additional RFD/FFD wireless device is attached within a database.

The method continues with an operation 309 for determining whether or not an instruction has been received to proceed with commissioning of the PMMN for the consolidated shipment. The instruction to proceed with commissioning of the PMMN for the consolidated shipment would be received by the server computing system 107 after the operations 305 and 307 have been performed for the final shipment component of the consolidated shipment. In some embodiments, the instruction to proceed with commissioning of the PMMN for the consolidated shipment can be transmitted to the server computer system 107 by having the user initiate transmission of a signal that the shipment component entries are complete, such as by scanning a special barcode, or by pressing a button on the scanner, or by selecting a control in graphical user interface, e.g., in a webpage, among other ways. If the operation 309 determines that the instruction to proceed with commissioning of the PMMN for the consolidated shipment has not been received, the method reverts back to the operation 305. If the operation 309 determines that the instruction to proceed with commissioning of the PMMN for the consolidated shipment has been received, the method continues with an operation 311 in which the server computing system 107 generates a unique broadcast address for the PMMN and transmits the unique broadcast address for the PMMN to the managing FFD(0) wireless device of the PMMN. It should be understood that in some embodiments the unique broadcast address for the PMMN can be generated by the server computing system 107 at any time after receiving the unique identifier of the managing FFD(0) wireless device in operation 301. The operation 311 also includes operation of the server computing system 107 to generate a listing of each unique identifier of RFD/FFD wireless devices within the PMMN for the consolidated shipment. Also, in the operation 311, the server computing system 107 operates to transmit the listing of each unique identifier of RFD/FFD wireless devices within the PMMN for the consolidated shipment to the managing FFD(0) wireless device of the PMMN for the consolidated shipment. The managing FFD(0) wireless device transmits the unique broadcast address for the PMMN to each RFD/FFD wireless device within the PMMN, thereby notifying each RFD/FFD wireless device within the PMMN as to which unique broadcast address they belong and should respond.

After the operation 311, the server computing system 107 monitors for receipt of a communication from the managing FFD(0) wireless device of the PMMN indicating whether or not all RFD/FFD wireless devices of the PMMN have acknowledged data communication with the managing FFD (0) wireless device. In an operation 313, the server computing system 107 receives a communication from the managing FFD(0) wireless device of the PMMN indicating failure of one or more RFD/FFD wireless devices in the PMMN to send an acknowledgement response to the managing FFD(0) wireless device of the PMMN. From the operation 313, the method proceeds with an operation 315 to send an alert to a user responsible for commissioning the consolidated shipment to communicate information regarding which of the RFD/FFD wireless devices in the PMMN has not responded with an acknowledgement response to join the PMMN. The user can then take corrective action, such as to swap out the non-responding RFD/FFD wireless device with another RFD/FFD wireless. In expectation of such corrective action, the method reverts back to operation 305. Therefore, it should be understood that if a shipping component becomes separated (missing/lost) from the consolidated shipment during shipping, the managing FFD(0) wireless device detects the absence of the RFD/FFD wireless device associated with the separated shipment component and notifies the server computing system 107 that the shipment component has been separated from the consolidated shipment. The server computing system 107 can correlate the absent RFD/FFD wireless device to the unique identifier of the separated shipment component using the stored list of unique identifier associations that was generated during establishment of the PMMN. After the operation 311, the method can also proceed with an operation 317 in which the server computing system 107 receives a communication from the managing FFD(0) wireless device of the PMMN indicating receipt by the managing FFD(0) wireless device of acknowledgement responses from all RFD/FFD wireless devices in the PMMN for the consolidated shipment. Following operation 317, the server computing system 107 can commence tracking of the consolidated shipment by way of the PMMN that includes the managing FFD(0) wireless device and the additional RFD/FFD wireless devices.

Figure 4:
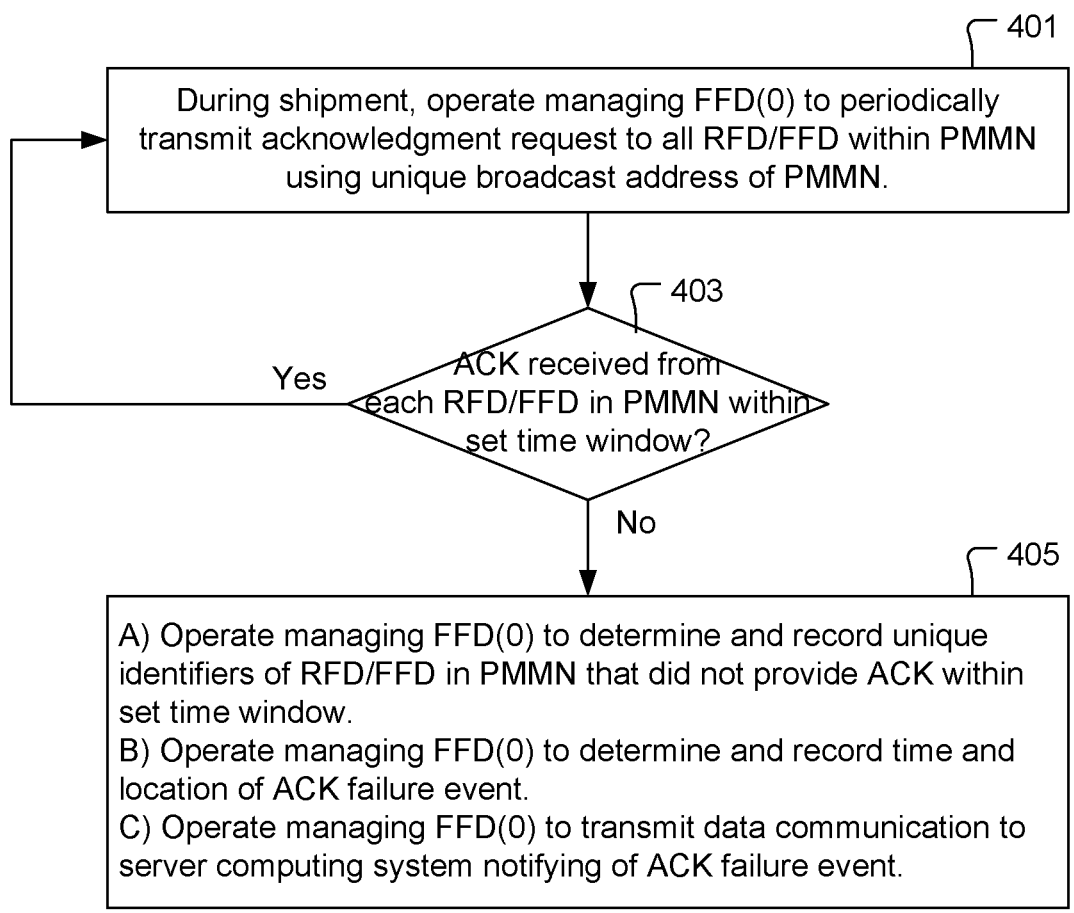
FIG. 4 shows a flowchart of a method for operating a managing FFD(0) wireless device within a PMMN for a consolidated shipment during shipping of the consolidated shipment, in accordance with some embodiments.

FIG. 4 shows a flowchart of a method for operating a managing FFD(0) wireless device within a PMMN for a consolidated shipment during shipping of the consolidated shipment, in accordance with some embodiments. The method of FIG. 4 considers that the commissioning the consolidated shipment and the successful establishment of the PMMN for the consolidated shipment has been completed. The method includes an operation 401 in which the managing FFD(0) is operated to periodically transmit an acknowledgement request to all RFD/FFD wireless devices within the PMMN for the consolidated shipment using the unique broadcast address of the PMMN, as received from the server computing system 107 during establishment of the PMMN for the consolidated shipment. The method proceeds with an operation 403 in which a determination is made as to whether or not an acknowledgement response (ACK) has been received from each RFD/FFD wireless device in the PMMN for the consolidated shipment within a set time window following transmission of the acknowledgment request in operation 401. The set time window used in operation 403 can be user-prescribed/programmed in the managing FFD(0) wireless device by a user via the server computing system 107 during establishment of the PMMN for the consolidated shipment. Also, in some embodiments, the set time window used in operation 403 can be re-programmed, i.e., adjusted, in the managing FFD(0) wireless device by a user via the server computing system 107 during shipping of the consolidated shipment. If it is determined that an acknowledgement response has been received from each RFD/FFD wireless device in the PPMN for the consolidated shipment within the set time window following transmission of the acknowledgment request in operation 401, the method reverts back to operation 401. If it is determined that an acknowledgement response has not been received from a given RFD/FFD wireless device in the PMMN within the set time window following transmission of the acknowledgment request in operation 401, an acknowledgement response failure event has occurred and the method proceeds with an operation 405 to process the acknowledgement response failure event.

In the operation 405, the managing FFD(0) wireless device is operated to determine and record the unique identifier(s) of the RFD/FFD wireless device(s) in the PMMN of the consolidated shipment that did not provide an acknowledgment response within the set time window following transmission of the acknowledgment request in operation 401. Also, in the operation 405, the managing FFD(0) wireless device is operated to determine and record the time and location at which the acknowledgement response failure event occurred. Also, in the operation 405, the managing FFD(0) wireless device is operated to transmit a data communication to the server computing system 107 notifying of the acknowledgement response failure event and providing information on which RFD/FFD wireless devices failed to provide an acknowledgment response within the set time window following transmission of the acknowledgment request in operation 401. In some embodiments, prior to performing the operation 405, the managing FFD(0) wireless device can be configured to retry transmission of the acknowledgement request to all RFD/FFD wireless devices within the PMMN for the consolidated shipment using the unique broadcast address of the PMMN a set number of times, with performance of operation 403 after each of the transmission retries. The set number of times to retry transmission of the acknowledgement request to all RFD/FFD wireless devices within the PMMN for the consolidated shipment before continuing on with the operation 405 can be user-prescribed/programmed in the managing FFD(0) wireless device by a user via the server computing system 107 during establishment of the PMMN for the consolidated shipment, and in some embodiments can be changed by a user via the server computing system 107 during shipping of the consolidated shipment.

Also, it should be understood that the managing FFD(0) wireless device can be directed to request various types of parametric data (such and temperature, humidity, etc.) from the RFD/FFD wireless devices within the PMMN for the consolidated shipment at any time during shipping of the consolidated shipment, with the RFD/FFD wireless devices operating to respond to the managing FFD(0) wireless device to provided the requested parametric data. Additionally, in some embodiments, the RFD/FFD wireless devices within the PMMN for the consolidated shipment can be configured to continuously monitor for various conditions (such as impact forces, vibrational forces, temperature thresholds, humidity thresholds, etc.) and provide an unprompted data communication to the managing FFD(0) wireless device of the PMMN when such conditions occur. The managing FFD(0) wireless device of the PMMN of the consolidated shipment can in turn record the condition occurrence in association with the RFD/FFD wireless devices that experienced the condition along with the time and location when the condition occurred. And, in some embodiments, the managing FFD(0) wireless device of the PMMN of the consolidated shipment can communicate data to the server computing system 107 during shipping notifying of the occurrence of the condition and of the RFD/FFD wireless device that experienced the condition.

The PMMN data resident on the server computing system 107 has multiple purposes. For example, the PMMN data provides for association of the unique identifier of each of the RFD/FFD wireless devices in the PMMN with unique identifier(s) of one or more shipment component(s) with the consolidated shipment. Also, the PMMN data enables the server computing system 107 to build an RFD/FFD wireless device list for the PMMN. And, this RFD/FFD wireless device list for the PMMN can be used to create the PMMN tracking network for the consolidated shipment. Also, when a given RFD/FFD wireless device fails to report during shipping, i.e., fails to provide an acknowledgement response to the managing FFD(0) wireless device, the PMMN data enables determination of which shipment component(s) correspond to the non-reporting RFD/FFD wireless device, thereby enabling a recording and notification of when and where the shipment component(s) were separated (missing/lost).

In some embodiments, only one wireless device 105A may be used. In these embodiments, the one wireless device 105A will be a FFD wireless device. As discussed above, if multiple wireless devices 105A-105(n) are to be associated with multiple shipment components, additional RFD/FFD wireless devices can be used. The FFD wireless device has the benefit of being a fully independent wireless device, but can be more costly and have a larger size. As discussed above, in some embodiments, if the consolidated shipment includes many shipment components, a single managing FFD(0) wireless device can be used to track and manage the RFD/FFD wireless devices in the PMMN for the consolidated shipment. In these embodiments, additional shipment components can be tracked using RFD wireless devices that are networked through PMMN with the managing FFD(0) wireless device.

After departure of the consolidated shipment from a shipment origin, the managing FFD(0) wireless device uses the unique broadcast address of the PMMN for the consolidated shipment to simultaneously communicate with all RFD/FFD wireless devices in the PMMN for the consolidated shipment. In some embodiments, a typical communication with the RFD/FFD wireless devices in the PMMN is a periodic broadcast of a network beacon with the unique broadcast address of the PMMN for the consolidated shipment as the destination. All RFD/FFD wireless devices in the PMMN for the consolidated shipment are required to respond with an acknowledgement response. To establish the PMMN for the consolidated shipment, a wireless protocol is defined to group all RFD/FFD wireless devices in the PMMN for the consolidated shipment into an independent functioning mobile network. In some embodiments, the PMMN for the consolidated shipment uses peer-to-peer communication to establish proximity of RFD/FFD wireless devices to each other by electronic "roll call." Peer-to-peer communication methods can consume significant power from participating RFD/FFD wireless devices, particularly if the PMMN includes a large number of RFD/FFD wireless devices. Minimizing power consumption by the RFD/FFD wireless devices in the PMMN for the consolidated shipment is important to ensure that the RFD/FFD wireless devices remain operable through completion of the shipping process. To achieve power management goals, the PMMN for the consolidated shipment can be operated to reduce peer-to-peer communication between RFD/FFD wireless devices of the PMMN by over 99%. For example, by assigning a unique broadcast address to the PMMN and by using a managing FFD(0) wireless device, significant reduction in power consumption can be realized by the RFD/FFD wireless devices within the PMMN. The entire group of RFD/FFD wireless devices in the PMMN can respond as one device by using the unique broadcast address of the PMMN for the consolidated shipment. When the consolidated shipment departs its origination location and tracking begins, the managing FFD(0) wireless device can periodically query all RFD/FFD wireless devices within the PMMN for the consolidated shipment with a single transmission using the unique broadcast address of the PMMN. Only the RFD/FFD wireless devices within range of the managing FFD(0) wireless device that have the same unique broadcast address of the PMMN will respond. All responding RFD/FFD wireless devices are considered to be in range and not separated (missing/lost).

The managing FFD(0) wireless device is configured to utilize an onboard schedule to maintain the PMMN status for the consolidated shipment. All RFD/FFD wireless devices in the PMMN should respond on a periodic basis with minimal retries or peer-to-peer communication. RFD/FFD wireless devices that continuously fail to respond are interpreted as out of range and missing/lost from the PMMN. Missing RFD/FFD wireless devices are considered a network fault and are considered alarm conditions to be reported to the server computing system 107 through an available network connection (LAN or WAN). In some embodiments, if multiple FFD wireless devices are in a consolidated shipment, the first FFD wireless device that has its unique identifier communicated to server computing system 107 can be set as the managing FFD(0) wireless device. After departure of the consolidated shipment from its shipment origin, the managing FFD(0) wireless device can begin to periodically transmit a radio beacon using the unique broadcast address of the PMMN for the consolidated shipment. In some embodiments, each RFD/FFD wireless devices receiving the radio beacon that includes the unique broadcast address of the PMMN are required to acknowledge receipt of the radio beacon with a packet containing their address, battery status, and other state of health data. The managing FFD(0) wireless device can be configured to accumulate the acknowledgements received from the RFD/FFD wireless devices and compare them to the listing of RFD/FFD wireless devices in the PMMN to determine which, if any, RFD/FFD wireless device(s) are not responding. In some embodiments, upon receipt of acknowledgement from all RFD/FFD wireless devices in the PMMN, a timer is reset by the managing FFD(0) wireless device for notification of when the next radio beacon should be transmitted by the managing FFD(0) wireless device, and to indicate that all RFD/FFD wireless devices in the PMMN have responded. It should be appreciated that the systems and methods disclosed herein optimize the proximity maintenance process by minimizing the number of transmissions required to determine which RFD/FFD wireless devices in the PMMN are in-range. In some embodiments, the managing FFD(0) wireless device limits utilization of peer-to-peer communication to when particular RFD/FFD wireless devices in the PMMN continuously fail to respond. For example, prior to initiating a tracking failure alert, the managing FFD(0) wireless device can automatically transition to a peer-to-peer command mode. The peer-to-peer command mode verifies that a particular RFD/FFD wireless devices in the PMMN is out of range (missing/lost). If the periodic radio beacon broadcast and the peer-to-peer commands fail with a particular RFD/FFD wireless devices in the PMMN, the managing FFD(0) wireless device executes a lost device event protocol which can be defined by a user. Also, if a separated shipping component is no longer separated, i.e., rejoins the PMMN by responding to an acknowledgement request, the time and location at which the separated shipping component rejoined the PMMN is recorded and can be reported to the server computing system 107 by the managing FFD(0) wireless device.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in other embodiments, even if not specifically shown or described. Such variations of the example embodiments disclosed herein are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the example embodiments disclosed herein are to be considered as illustrative and not restrictive, and the invention is not to be limited to the details given herein, but may be modified within the scope and equivalents of the described embodiments.

What is claimed is:

1. A method for establishing a Proximity Monitoring Mobile Network (PMMN) for use in monitoring multiple different components of a consolidated shipment during shipping of the consolidated shipment, comprising:

receiving a unique identifier of a managing wireless device of the PMMN for the consolidated shipment at a server computing system, the managing wireless device attached to a first shipment component of the consolidated shipment, wherein the unique identifier of the managing wireless device is included in the PMMN for the consolidated shipment;

receiving a unique identifier of the first shipment component at the server computing system;

creating and storing an association between the unique identifier of the managing wireless device and the unique identifier of the first shipment component at the server computing system;

receiving a unique identifier of an additional wireless device of the PMMN for the consolidated shipment at the server computing system, the additional wireless device attached to an additional shipment component of the consolidated shipment, wherein the unique identifier of the additional wireless device is included in the PMMN for the consolidated shipment;

receiving a unique identifier of the additional shipment component at the server computing system;

creating and storing an association between the unique identifier of the additional wireless device and the unique identifier of the additional shipment component at the server computing system;

receiving an instruction at the server computing system to proceed with commissioning of the PMMN for the consolidated shipment;

generating a unique broadcast address for the PMMN for the consolidated shipment;

wirelessly transmitting the unique broadcast address for the PMMN for the consolidated shipment to the managing wireless device;

generating a listing of unique identifiers of wireless devices of the PMMN for the consolidated shipment; and wirelessly transmitting the listing of unique identifiers of wireless devices of the PMMN for the consolidated shipment to the managing wireless device before shipping of the consolidated shipment.

2. The method as recited in claim 1, further comprising:

directing operation of the managing wireless device to communicate the unique broadcast address for the PMMN for the consolidated shipment to each wireless device listed in the listing of unique identifiers of wireless devices of the PMMN for the consolidated shipment.

3. The method as recited in claim 2, further comprising:

directing the managing wireless device to broadcast an acknowledgement request that includes the unique broadcast address for the PMMN for the consolidated shipment; and directing the managing wireless device to provide notification as to whether or not each wireless device listed in the listing of unique identifiers of wireless devices of the PMMN for the consolidated shipment provides an acknowledgement response in reply to the acknowledgement request.

4. The method as recited in claim 3, further comprising:

tracking the consolidated shipment through communication with the managing wireless device after receiving notification from the managing wireless device that each wireless device listed in the listing of unique identifiers of wireless devices of the PMMN for the consolidated shipment has replied to the acknowledgement request.

5. The method as recited in claim 4, wherein tracking the consolidated shipment through communication with the managing wireless device includes operating the managing wireless device to periodically transmit an acknowledgement request that includes the unique broadcast address of the PMMN for the consolidated shipment, and operating each wireless device listed in the listing of unique identifiers of wireless devices of the PMMN for the consolidated shipment that receives the acknowledgement request to respond by transmitting an acknowledgement response to the managing wireless device.

6. The method as recited in claim 5, wherein tracking the consolidated shipment through communication with the managing wireless device further includes operating the managing wireless device to determine whether or not each wireless device listed in the listing of unique identifiers of wireless devices of the PMMN for the consolidated shipment has responded to the acknowledgement request within a set time window, and operating the managing wireless device to record an acknowledgment failure event for each wireless device listed in the listing of unique identifiers of wireless devices of the PMMN for the consolidated shipment that does not respond to the acknowledgement request within the set time window, wherein the acknowledgment failure event includes an identifier of each wireless device that does not respond to the acknowledgement request within the set time window, and a date and a time when the acknowledgment failure event occurs, and a global position of the managing wireless device when the acknowledgment failure event occurs.

7. The method as recited in claim 6, wherein tracking the consolidated shipment through communication with the managing wireless device further includes operating the managing wireless device to transmit data notifying of the acknowledgment failure event to the server computing system.

8. The method as recited in claim 4, further comprising:
operating the managing wireless device to acquire parametric data from one or more of the wireless devices listed in the listing of unique identifiers of wireless devices of the PMMN for the consolidated shipment and transmit the acquired parametric data to the server computing system.

9. The method as recited in claim 4, wherein the managing wireless device includes a first local area communication device, a wide area communication device, a global position determination device, and a battery.

10. The method as recited in claim 9, wherein the managing wireless device is configured for communication with the server computing system through the wide area communication device.

11. The method as recited in claim 10, wherein the additional wireless device includes a second local area communication device and a battery.

12. The method as recited in claim 11, wherein the additional wireless device is configured for bi-directional communication with the managing wireless device through the second local area communication device of the additional wireless device and through the first local area communication device of the managing wireless device.

13. The method as recited in claim 12, further comprising:
operating the additional wireless device to receive the acknowledgement request through second local area communication device of the additional wireless device; and
operating the additional wireless device to provide an acknowledgement response to the managing wireless device in reply to the acknowledgement request after determining that the unique broadcast address in the acknowledgement request matches a broadcast address to which the additional wireless device is associated.

14. The method as recited in claim 13, wherein the acknowledgement response includes the unique identifier of the additional wireless device.

15. The method as recited in claim 12, further comprising:
operating the managing wireless device to record a date, a time, and a location when any wireless device listed in the listing of unique identifiers of wireless devices of the PMMN for the consolidated shipment fails to provide an acknowledgement response in reply to the acknowledgement request.

16. The method as recited in claim 15, further comprising:
operating the managing wireless device to transmit data specifying the date, the time, and the location when any wireless device listed in the listing of unique identifiers of wireless devices of the PMMN for the consolidated shipment fails to provide an acknowledgement response in reply to the acknowledgement request, wherein the data is transmitted to the server computing system through the wide area communication device.

17. The method as recited in claim 11, wherein the first local area communication device is a radio, and wherein the second local area communication device is a radio.

18. The method as recited in claim 11, wherein the first local area communication device is an IEEE Standard 802.15.4 radio, and wherein the second local area communication device is an IEEE Standard 802.15.4 radio.

19. The method as recited in claim 9, wherein the wide area communication device includes one or more of a cellular network communication device and a satellite network communication device.

20. The method as recited in claim 9, wherein the managing wireless device is configured to communicate with an Internet gateway through at least one of the first local area communication device and the wide area communication device.

\* \* \* \* \*